3,639,586
PROCESS FOR THE MANUFACTURE OF MIXED ANHYDRIDES CONTAINING ALKALI CHLORIDE, OF SORBIC ACID WITH PALMITIC OR STEARIC ACID AND THEIR USE AS PRESERVATIVES FOR BREAD AND PASTRY
Hans Fernholz, Fischbach, Taunus, and Hermann Neu, Neu-Isenberg, Germany, assignors to Farbwerke Hoechst Aktiengesellschaft vormals Meister Lucius & Bruning, Frankfurt am Main, Germany
No Drawing. Filed Mar. 11, 1969, Ser. No. 806,313
Claims priority, application Germany, Mar. 16, 1968, F 55,088
Int. Cl. A01n 11/02, 13/00
U.S. Cl. 424—153                                         5 Claims

ABSTRACT OF THE DISCLOSURE

Mixed anhydrides of sorbic acid with palmitic acid or stearic acid are manufactured by reacting the acid chloride in a nonpolar organic solvent with sodium sorbate or potassium sorbate, the resulting anhydride containing 10 to 20% by weight of the alkali chloride. The mixture is used for preserving bread and pastry.

---

The present invention relates to a process for the manufacture of mixed anhydrides, containing alkali chloride, of sorbic acid with palmitic or stearic acid and their use as preservatives for bread and pastry.

It has already been proposed to preserve bread and pastry by adding to the dough, before baking, a mixed anhydride of sorbic acid and an aliphatic carboxylic acid with more than 5 carbon atoms in the molecule or a mixture of said anhydrides in an amount within the range of from 0.01 to 3.0% calculated on the weight of the dough. As carboxylic acid it is advantageous to use a natural fatty acid occurring in fats or oils, for example, palmitic acid or stearic acid. As starting products, pure alkali salts of the said fatty acids and pure fatty acid chlorides are advantageously used since the mixed sorbic acid-fatty acid anhydrides to be used as preservatives have to meet exacting standards of purity.

These anhydrides may be obtained by known methods, for example by reaction of the chloride of one of the fatty acids, preferably the one having the longer chain, with the alkali salt of the other fatty acid or by reaction of the acid chloride with the free acid in the presence of a tertiary base, for example pyridine, to bind the hydrochloric acid which is set free in the form of a salt thereof. Since the mixed sorbic acid-palmitic or stearic acid anhydrides to be used as food preservatives have to fulfil high standards of purity, the latter process is not suitable for this purpose. The separation of the bases or quaternary salts is technically complicated because the last traces are very difficult to remove.

The process for the preparation of mixed anhydrides of sorbic acid and palmitic or stearic acid in a pure state by the reaction of the fatty acid chlorides with the alkali salt of sorbic acid in an organic solvent followed by the separation of the alkali chlorides is also unsatisfactory as the alkali chlorides precipitate in a very fine, and partially colloidal, form and can therefore be isolated only with difficulty and great losses.

When a relatively large excess of alkali sorbate is left in the mixed sorbic acid anhydrides, fermentation in the dough is impeded. The excess of alkali sorbate in the mixed sorbic acid anhydrides should not therefore exceed 4% by weight. When an excess of fatty acid chloride is used for the reaction, this excess enters the solvent from which it must be separated in a complicated manner.

When the mixed sorbic acid-fatty acid anhydrides are obtained by evaporating or cooling the solvent, the anhydrides must be thoroughly washed with solvents to remove adhering amounts of fatty acid chloride since the latter favor the decomposition of the mixed anhydrides and affect taste and odor. The mixed sorbic acid anhydrides also tend to rearrange themselves into symmetric anhydrides, that is into sorbic acid anhydride and fatty acid anhydride. The solution of the mixed sorbic acid anhydrides in solvents at elevated temperature favors the rearrangement. The commonly used purification methods, for example, recrystallization or solution and crystallization, cannot therefore be used in this case. The reaction of alkali sorbates with fatty acid chlorides in the absence of solvents is not suitable, either; the reaction of the starting products is unsatisfactory and the temperature cannot be regulated exactly. The formation of undesirable sorbic acid anhydride which considerably affects taste and odor cannot be avoided in that process.

The present invention provides a process for the manufacture of mixed anhydrides, containing alkali chloride, of sorbic acid with palmitic acid or stearic acid, suitable for preserving bread and pastry, which comprises dissolving palmitic acid chloride or stearic acid chloride in 5 to 10 times, preferably 6 to 7 times, the amount of an inert, nonpolar, low-boiling organic solvent and reacting it at a temperature within the range of from 0° to 20° C., preferably 5° to 15° C., with such an amount, advantageously an equivalent amount, of sodium sorbate or potassium sorbate that the anhydride or sorbic acid-palmitic acid or sorbic acid-stearic acid, after isolation and drying, contains about 10 to 20% by weight sodium chloride or potassium chloride.

In the process of the invention it is advantageous to react equivalent or almost equivalent amounts of the starting products. An excess of fatty acid chloride must be removed from the reaition produrt very carefully, for exampe, by repeated washing with an inert solvent. An excess of alkali sorbate is left in the solid reaction products and if said excess excetds 4% by weight fermentation in the dough is impeded. The following table indicates the amounts of alkali chloride contained in the mixed sorbic acid-fatty acid anhydrides when (a) stoichiometric amounts of alkali sorbate and fatty acid chloride are reacted and (b) the alkali sorbate is present in an excess of 10%.

TABLE

Equivalent amounts of alkali sorbate and fatty acid chloride: Content of alkali chloride (percent) in the mixed sorbic acid anhydride (1) Potassium sorbate+palmitic acid chloride
=sorbic acid-palmitic anhydride+KCl _____ 17.5
(2) Sodium sorbate+palmitic acid chloride=
sorbic acid-palmitic acid anhydride+NaCl __ 14.3
(3) Potassium sorbate+stearic acid chloride=
sorbic acid-stearic acid anhydride+KCl _____ 16.5
(4) Sodium sorbate+stearic acid chloride=
acid-stearic acid anhydride+NaCl _____ 13.4

Excess amount of alkali sorbate of 10% in starting mixture:

(1) Potassium sorbate+palmitic acid chloride
=sorbic acid-palmitic acid anhydride+KCl __ 17.0
(2) Sodium sorbate+palmitic acid chloride=
sorbic acid-palmitic acid anhydride+NaCl _____ 13.9
(3) Potassium sorbate+stearic acid chloride
=sorbic acid-stearic acid anhydride+KCl ___ 15.9
(4) Sodium sorbate+stearic acid chloride=
sorbic acid-stearic acid anhydride+NaCl ____ 13.0

The content of alkali chloride in the end product is also shifted by the solubility of the mixed sorbic acid anhydride in the solvent. Because of the insolubility of the alkali chlorides, the absolute content of the latter remains constant. The dissolved amount of mixed sorbic acid anhydride depends on the ratio of solid matter to solvent and, if the product is separated by cooling, also on the temperature used.

As solvents for the mixed sorbic acid anhydrides, aliphatic hydrocarbons with up to 7 carbon atoms, for example, pentane, hexane or a hydrocarbon mixture as it is obtained in the form of a petroleum ether fraction having a boiling point within the range of from 30° to 75° C. in the distillation of gasoline, or cyclohexane, or carbon tetrachloride may be used. The dissolved or suspended solid matter can be separated from the solvent in a technically simple manner by evaporating the solvent or cooling it to such an extent that the solid matter precipitates can then be filtered off. The latter method has the advantage that the fatty acid chloride that has not been reacted and is in excess of the stoichiometric ratio remains in the solvent. After drying the solid matter, a sorbic acid-palmitic acid anhydride or sorbic acid-stearic acid anhydride having a content of alkali chloride of about 10 to 20% by weight is obtained.

The process of the invention offers the advantage that a disporportionation of the mixed sorbic acid anhydrides into symmetric anhydrides is substantially prevented.

Also, the process in accordance with the invention dispenses with the separation of the alkali chloride. Such separation involves considerable difficulties because the alkali chloride is formed in organic solvents in an extremely fine distribution, often even in a colloidal form. On filtration or centrifuging. the low-boiling solvent is evaporated so that a part of the mixed sorbic acid anhydride precipitates because the solubility product is surpassed, and remains in the filter cake containing alkali chloride.

The alkali content of the mixed sorbic acid anhydrides prevents lump formation of the products and consequently the occulsion of solvent and residual amounts of moisture which would reduce the stability of the mixed sorbic acid anhydrides. The mixed sorbic acid anhydrides obtained by the process of the invention are distinguished by an extremely good stability and storage life. Whereas mixed sorbic acid anhydrides free of alkali chloride after about a fortnight show a distinct yellow discoloration and have the pungent odor of decomposition products due to the progressing autoxidation of the sorbic acid, the mixed sorbic acid anhydrides of the invention, containing alkali chloride, can be stored for more than 3 months without any deterioration.

The amount of about 10 to 20% alkali chloride contained in the mixed sorbic acid anhydrides of the invention does not interfere with the use of the anhydrides as bread preservatives since common salt is added to the dough, except for special bread. Potassium chloride is contained in the flour by nature.

The following examples serve to illustrate the invention, but are not intended to limit it.

EXAMPLE 1

138 grams palmitic acid chloride were dissolved in 800 grams hexane. 67 grams sodium sorbate were slowly addded to 10° C. while stirring. The mixture was then stirred for 15 hours at 10° to 15° C. After the addition of 300 grams hexane the mixture was cooled to —20° C. The solid matter was filtered off and dried. Yield: 195 grams of a mixture of 85.1% by weight sorbic acid-palmitic acid anhydride and 14.9% by weight sodium chloride.

An addition of 0.35% by weight of the above sorbic acid-palmitic acid anhydride to a dough made with yeast had no influence on the raising power of the yeast. When the pastry so preserved was stored for 15 days at room temperature in polyethylene bags it was protected against mold just as effectively as was a comparison pastry containing 0.3% by weight sorbic acid-palmitic acid anhydride free from sodium chloride.

EXAMPLE 2

151 grams stearic acid chloride were dissolved in 900 grams petroleum ether (boiling point 30° to 75° C.). 67 grams sodium sorbate were slowly added at 15° C. while stirring. The mixture was then stirred for 20 hours at 15° to 20° C. After the addition of 400 grams petroleum ether, the mixture was cooled to —30° C. The solid matter was then filtered off and dried. Yield: 206 grams of a mixture of 86.5% by weight sorbic acid-stearic acid anhydride and 13.5% by weight sodium chloride.

An addition of 0.35% by weight of the above sorbic acid-stearic acid anhydride to a dough made with yeast had no influence on the raising power of the yeast. When the pastry so preserved was stored for 15 days at room temperature in polyethylene bags it was protected against mold just as effectively as was a comparison pastry containing 0.3% by weight sorbic acid-stearic acid anhydride free from sodium chloride.

EXAMPLE 3

138 grams palmitic acid chloride were dissolved in 800 grams petroleum ether (boiling point 35° to 70° C.). 75 grams potassium sorbate were slowly added at 15° C. while stirring. Stirring was continued for 12 hours at 15° to 20° C. After the addition of 500 grams petroleum ether the mixture was cooled to —25° C. The solid matter was then filtered off and dried. Yield: 204 grams of a mixture of 81.7% by weight sorbic acid-palmitic acid anhydride and 18.3% by weight potassium chloride.

An addition of 0.35% by weight of the above sorbic acid-palmitic acid anhydride to a dough made with yeast had no influence on the raising power of the yeast. When the pastry so preserved was stored for 15 days at room temperature in polyethylene bags it was protected against mold just as effectively as was a comparison pastry containing 0.3% by weight sorbic acid-palmitic acid anhydride free from potassium chloride.

EXAMPLE 4

151 grams stearic acid chloride were dissolved in 2000 grams petroleum ether. 75 grams potassium sorbate were added while stirring. The mixture was then stirred for 12 hours at 15° to 20° C. After the addition of 200 grams petroleum ether the mixture was cooled to —20° C. The solid matter was filtered off and dried. Yield: 215 grams of a mixture of 82.8% by weight sorbic acid-stearic acid anhydride and 17.2% by weight potassium chloride.

An addition of 0.35% by weight of the above sorbic acid-stearic acid anhydride to a dough made with yeast had no influence on the raising power of the yeast. When the pastry so preserved was stored for 15 days at room temperature in polyethylene bags it was protected against mold just as effectively as was a comparison pastry containing 0.3% by weight sorbic acid-stearic acid anhydride free from potassium chloride.

What is claimed is:

1. A process for the manufacture of a mixed product consisting essentially of 10–20 percent, by dry weight, of a member selected from the group consisting of sodium chloride and potassium chloride, the balance being a mixed anhydride formed between sorbic acid and a fatty acid selected from the group consisting of palmitic acid and stearic acid, which process comprises reacting the acid chloride of said fatty acid with an equivalent amount of an alkali metal sorbate selected from the group consisting of sodium sorbate and potassium sorbate at a temperature from 0° to 20° C. in from 5 to 10 parts, per part of said acid chloride, of an inert low-boiling, non-polar, aliphatic hydrocarbon solvent having up to seven carbon atoms, and recovering said product from the solvent.

2. The process of claim 1 wherein said solvent is hexane.

3. The process of claim 1 wherein the solvent is a petroleum ether having a boiling point within the range from 30° to 75° C.

4. The process of claim 1 wherein said acid chloride and alkali metal sorbate are reacted in 6 to 7 parts, per part of said acid chloride, of solvent.

5. The process of claim 1 wherein said acid chloride and alkali metal sorbate are reacted at a temperature from 5° C. to 15° C.

References Cited

UNITED STATES PATENTS

| | | | |
|---|---|---|---|
| 195,420 | 9/1877 | Toninetti | 424—317 X |
| 201,344 | 3/1878 | Georges | 424—317 X |
| 3,097,996 | 7/1963 | Thoma et al. | 424—317 |
| 3,139,378 | 6/1964 | Gooding | 424—317 X |
| 3,404,987 | 10/1968 | Kooistra et al. | 99—150 |
| 3,510,317 | 5/1970 | Fernholz et al. | 99—150 |

OTHER REFERENCES

Deutsche Chemische Gesellschaft Berichte, vol. 68B, pp. 728–31, 1935.

The Journal of the American Oil Chemists' Society, vol. 31, pp. 151–57, 1954.

ALBERT T. MEYERS, Primary Examiner

D. J. FUNDERBURK, Assistant Examiner

U.S. Cl. X.R.

99—224; 424—318